United States Patent
Nowlin

(10) Patent No.: US 7,228,103 B2
(45) Date of Patent: Jun. 5, 2007

(54) METHOD AND APPARATUS FOR IMPROVING CO-EXISTENCE BETWEEN BLUETOOTH AND 802.11 NETWORKS

(75) Inventor: Dan Nowlin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 10/194,378

(22) Filed: Jul. 12, 2002

(65) Prior Publication Data

US 2004/0203367 A1    Oct. 14, 2004

(51) Int. Cl.
*H04B 7/00* (2006.01)
(52) U.S. Cl. .................. 455/41.2; 455/41.3; 455/67.11; 455/150.1; 455/166.2; 455/465
(58) Field of Classification Search ............... 455/41.2, 455/41.3, 67.11, 150.1, 166.2, 465, 418, 435.2
See application file for complete search history.

(56) References Cited

U.S. PATENT DOCUMENTS

| | | | | |
|---|---|---|---|---|
| 6,058,115 A | * | 5/2000 | Sawyer et al. | 370/401 |
| 6,326,926 B1 | * | 12/2001 | Shoobridge et al. | 343/702 |
| 6,526,264 B2 | * | 2/2003 | Sugar et al. | 455/84 |
| 6,594,241 B1 | * | 7/2003 | Malmlof | 370/329 |
| 2003/0092392 A1 | * | 5/2003 | Komandur et al. | 455/67.1 |
| 2003/0108062 A1 | * | 6/2003 | Agrawal et al. | 370/463 |

OTHER PUBLICATIONS

Specification of the Bluetooth System, version 1.1, published Feb. 22, 2001, Specification vol. 1, pp. 1-1,084. Specification vol. II, pp. 1-450.
ANSI/IEEE Standard 802.11 1999 edition, pp. 1-531, Reference No. ISO/IEC 8802-11: 1999-00-00.

* cited by examiner

*Primary Examiner*—Matthew Anderson
*Assistant Examiner*—Minh Dao
(74) *Attorney, Agent, or Firm*—Blakely, Sokoloff, Taylor & Zafman LLP

(57) ABSTRACT

A method and apparatus for improving co-existence between Bluetooth and 802.11 networks is described. In one embodiment, the invention is a method. The method includes detecting in software a backup in transmission of data through a first wireless channel. The method further includes shifting priority in software from transmission of data through a second wireless channel to transmission of data through the first wireless channel. The method also includes determining in software if the backup eases and shifting priority back in software from transmission of data through the first wireless channel to transmission of data through the second wireless channel. As will be appreciated, characteristics of an embodiment of the invention need not appear in all embodiments within the spirit and scope of the invention.

30 Claims, 8 Drawing Sheets

METHOD AND APPARATUS FOR IMPROVING CO-EXISTENCE BETWEEN BLUETOOTH AND 802.11 NETWORKS

BACKGROUND OF THE INVENTION

1. Field of the Invention

The invention generally relates to improved operation of communications devices in a system and more specifically to software involved in Bluetooth and 802.11 networks.

2. Description of the Related Art

As computing power has become more widespread, networking of computers has become more important. Wireline networks have existed and have been fine-tuned through years of use. However, wireless networks offer enhanced flexibility relative to wireline networks, and thus are becoming more popular. Wireless network technology is new relative to wireline networks, and thus has not received the fine-tuning received by wireline networks. Note that for this discussion, networks refer both to local area networks and to other connectivity technology, such as cabling between systems and peripherals for example.

Wireless technology can take a number of forms. Infrared ports allow for connectivity over short distances, and can be suitable for connections between systems and peripherals. Wireless LANs using the IEEE 802.11 standard (such as is described in the ANSI/IEEE Std 802.11, 1999 edition document) can be used for connecting systems in a manner similar to a wireline local area network. Bluetooth (as specified in "Specification of the Bluetooth System", Version 1.1, bearing a publication date of Feb. 22, 2001 and available from the "www.bluetooth.com" website) networks can also be useful for local area networks or for peripheral connectivity. Unfortunately, both 802.11 and Bluetooth operate in the 2.4 GHz band for wireless (RF) transmissions, and can potentially interfere. Moreover, 802.11 and Bluetooth systems can potentially be used in a single system, further allowing for interference between two antennas in the same physical machine.

This confluence of two wireless technologies in the same (general) frequency spectrum suggests that system designers would do well to choose one of the two technologies (Bluetooth or 802.11) but not both, and that IT professionals would then choose one of the two wireless technologies for a given portion of a company. Such a strategy necessarily restricts implementation options available to IT professionals, and thus is undesirable. Thus, it may be desirable to find a way to allow for co-existence between Bluetooth and 802.11. Moreover, it may be preferable to reduce the amount of hardware required to allow for co-existence of the two technologies.

BRIEF DESCRIPTION OF THE DRAWINGS

The present invention is illustrated by way of example and not limitation in the accompanying figures. As will be appreciated, characteristics of an embodiment of the invention need not appear in all embodiments within the spirit and scope of the invention.

DETAILED DESCRIPTION

Figure 1:
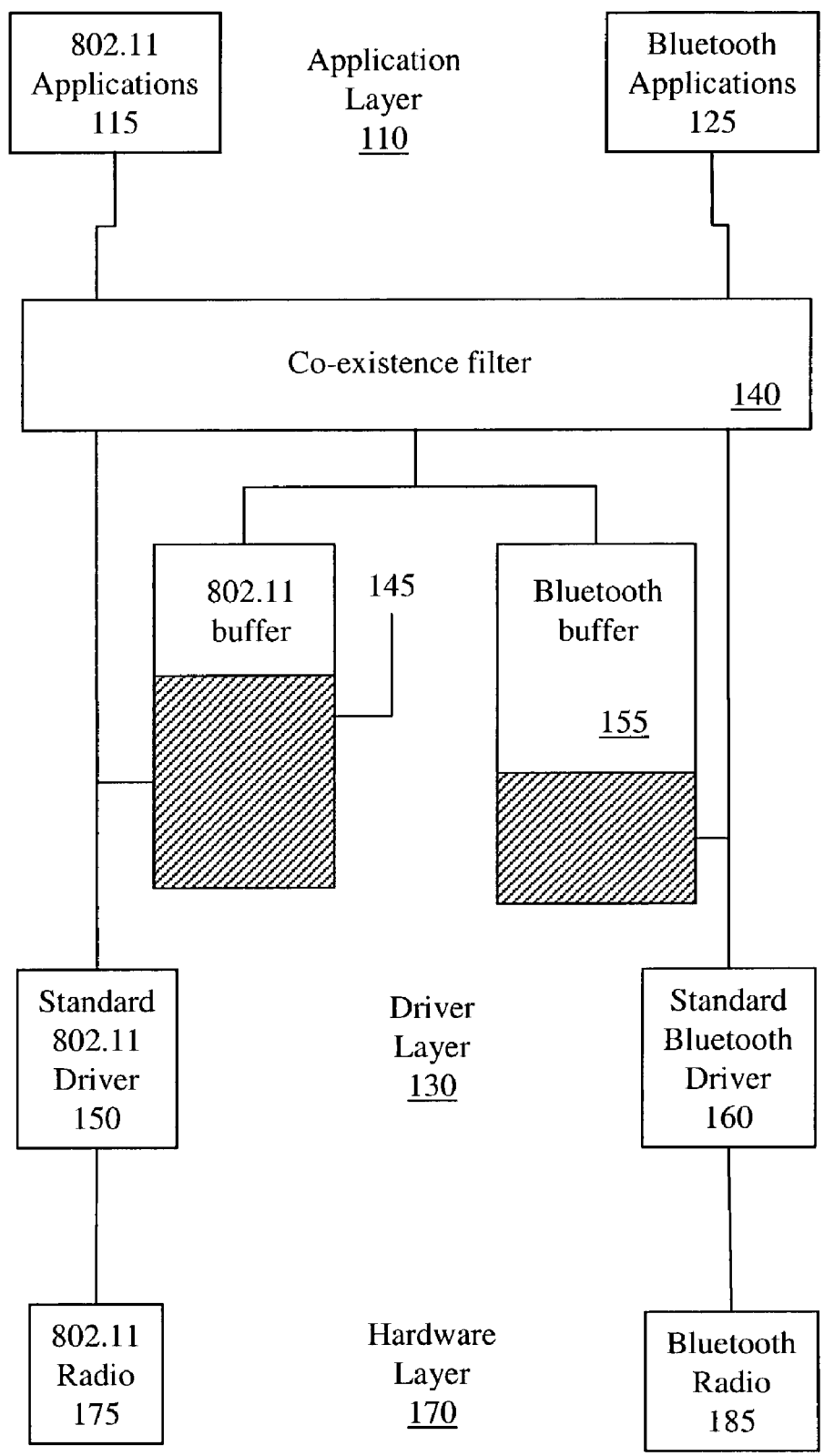
FIG. 1 illustrates an embodiment of an apparatus.

A method and apparatus for improving co-existence between Bluetooth and 802.11 networks is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, the invention is a method. The method includes detecting in software a backup in transmission of data through a first wireless channel. The method further includes shifting priority in software from transmission of data through a second wireless channel to transmission of data through the first wireless channel. The method also includes determining in software if the backup eases and shifting priority back in software from transmission of data through the first wireless channel to transmission of data through the second wireless channel.

In an alternate embodiment, the invention is a system. The system includes a processor, a control hub coupled to the processor, a memory coupled to the control hub, an I/O hub coupled to the control hub, a first wireless interface coupled to the I/O hub, and a second wireless interface coupled to the I/O hub. The processor is to detect in software a backup in transmission of data through a first wireless channel. The processor is also to shift priority in software from transmission of data through a second wireless channel to transmission of data through the first wireless channel. The processor is further to determine in software if the backup eases. The processor is also to shift priority back in software from transmission of data through the first wireless channel to transmission of data through the second wireless channel. The processor may perform responsive to instructions, such as those which may be stored in the memory for example.

In another embodiment, the invention is a method. The method includes detecting, in software, a drop in bandwidth (throughput) in any of the wireless protocols, when multiple wireless protocols are being utilized. The method further includes changing traffic priorities, in software, for sending data through the different protocols in order to help increase total wireless bandwidth. The method also includes a way to determine, in software, if/when the bandwidth situation has improved, thus allowing the original priorities to be restored.

In yet another embodiment, the invention is an apparatus. The apparatus includes a first logic block to detect in software a backup in transmission of data through a first wireless channel. The apparatus also includes a second logic block to shift priority in software from transmission of data through a second wireless channel to transmission of data through the first wireless channel. The apparatus further includes a third logic block to determine in software if the backup eases.

The method and apparatus may be implemented by means of a filter in software. Initially, the filter would allow everything to run at full speed, allowing both (or multiple) protocols to run simultaneously without restriction (100%). Then if backups started to occur, the filter may attempt to do a 50%–50% cycle—sending output data to one protocol 50% of the time and sending output data to the other protocol 50% of the time. Further shifts may be necessary and may be accomplished through use of the filter.

FIG. 1 illustrates an embodiment of an apparatus. The apparatus illustrated includes three layers of a computer or similar system. The layers are application layer 110, driver layer 130 and hardware layer 170. As will be appreciated, another layer, such as an operating system layer for example, may be inserted between the application layer 110 and the driver layer 130 for example. Similarly, other layers may be incorporated without exceeding the spirit and scope of the present invention.

In application layer 110, 802.11 applications 115 use the 802.11 protocol and hardware to communicate with devices, and Bluetooth applications 125 use the Bluetooth protocol and hardware to communicate with devices. Moreover, some applications may use both 802.11 and Bluetooth protocols and hardware.

Driver layer 130 includes co-existence filter 140, buffer 145, buffer 155, driver 150 and driver 160. Co-existence filter 140 receives and transmits data to applications 115 and applications 125, and thereby has access to not only information flowing in the two data paths, but also some ability to monitor throughput and efficiency in the Bluetooth and 802.11 data paths. Co-existence filter 140 provides Bluetooth data to Bluetooth buffer 155 and 802.11 data to 802.11 buffer 145. Moreover, co-existence filter 140 controls both buffer 145 and buffer 155, allowing for regulation of data input and output from both buffers.

Driver 150 is the 802.11 driver provided in the computer or system, and may be provided as part of an operating system, in conjunction with an 802.11 radio (such as radio 175) or from a different source. However, driver 150 need not be written to function specifically with co-existence filter 140, as driver 150 interfaces with buffer 145, just as it would were co-existence filter 140 not present. Driver 150 interfaces with buffer 145 to send data received by the hardware and to receive data for transmit. Similarly, driver 160 is the Bluetooth driver in the computer or system, with a source similar to one of the sources available for the 802.11 driver 150. Driver 160 also interfaces with Bluetooth buffer 155, to receive data for transmit and to send data received by the hardware.

Hardware layer 170 includes 802.11 radio 175 and Bluetooth radio 185 (and may contain other hardware as will be appreciated by one skilled in the art). 802.11 radio 175 is a radio suitable for transmitting and receiving data according to the 802.11 protocol at frequencies reserved for 802.11 local area networks. Similarly, Bluetooth radio 185 is a radio suitable for receiving and transmitting data according to the Bluetooth protocol at frequencies reserved for Bluetooth communications. Note that both of these radios generally operate at a frequency at or near 2.4 GHz in one embodiment, thus allowing for potential interference either due to transmitting from one radio to the other or due to noise in the system produced by one radio and sensed by the other radio.

Figure 2:
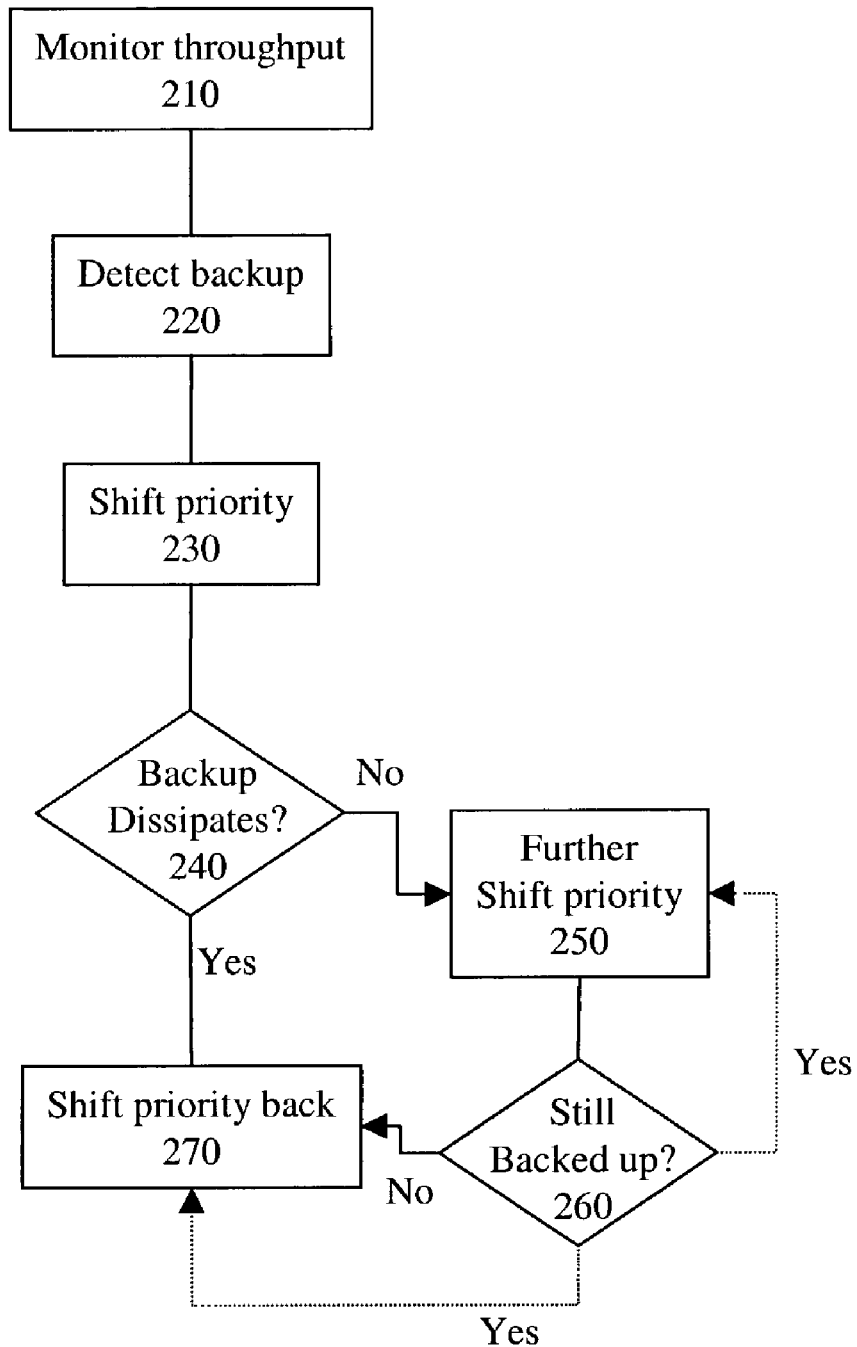
FIG. 2 illustrates an embodiment of a method.

FIG. 2 illustrates an embodiment of a method. This method may be implemented by a co-existence filter (such as the co-existence filter of FIG. 1 for example) to allow for co-existence of both Bluetooth and 802.11 hardware in a single device or system. At block 210, throughput of both the 802.11 and Bluetooth systems is monitored. At block 220, a backup (such as increasing amounts of data to be transmitted in one system) is detected. At block 230, priority for use of the radio is shifted such that the backup may be alleviated. Such a priority shift may, for example, involve shifting from an unaltered data flow (both Bluetooth and 802.11 traffic being unrestricted in sending data) to a prioritized approach, where each wireless protocol has some amount of exclusive time to send data. Initially, this protocol time sharing could be a 1:1 ratio (50% of the time devoted to exclusive Bluetooth traffic, 50% of the time devoted to exclusive 802.11 traffic). Thus, data throughput would be reduced in the channel without the backup in order to allow the channel with the backup to attempt to send more data. Additionally, if the filter driver 140 determines that much less data is being sent through one wireless protocol than another, the filter driver could devote more time to the protocol with more traffic.

At block 240, a determination is made as to whether the backup has dissipated. If so, priority is shifted back to an unrestricted state between the two channels at block 270. If not, priority may be further shifted, such as to a 75%–25% balance between the two channels at block 250. At block 260, another determination is made as to whether the backup is persisting. If not, at block 270 the normal priority is restored.

If so, the method may be implemented in at least two ways. In one embodiment, priority is shifted back at block 270, with the idea that whatever is causing the backup is external to the system and thus shifting priorities may not alleviate it. In an alternate embodiment, priority is shifted further still, setting up the potential for a positive feedback loop but also allowing for a shift which may alleviate the backup problem. As will be appreciated, a potential feedback loop may be alleviated either by limiting the shift in priority to a certain level or by limiting the number of times priority may be shifted. Furthermore, the actual duty cycles discussed and percentages involved are exemplary and not limiting to the spirit and scope of the present invention.

Figure 3:
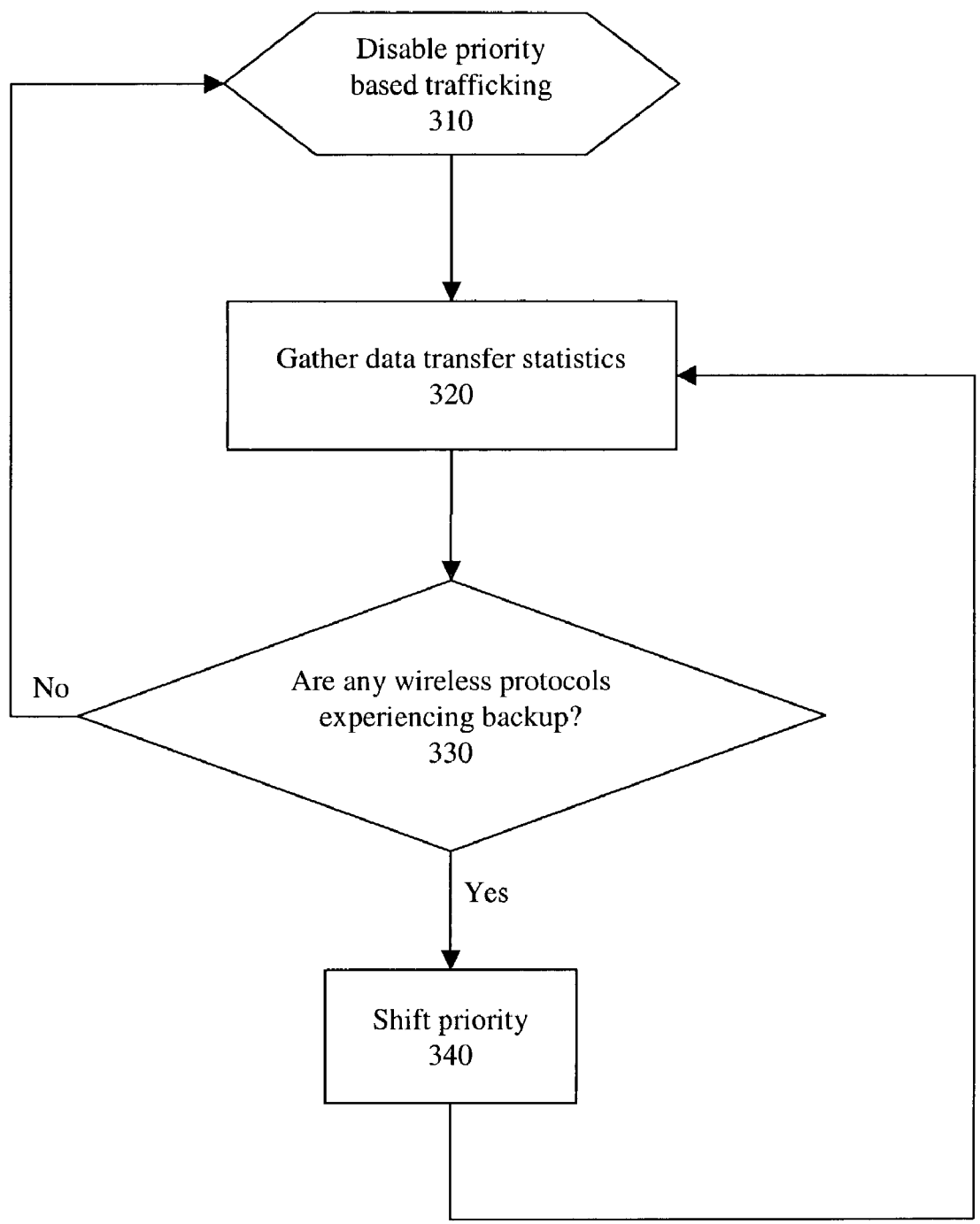
FIG. 3 illustrates another embodiment of a method.

FIG. 3 illustrates another embodiment of a method. At block 310, priority-based trafficking is disabled, such that an uninhibited data flow through both (or all) wireless channels may occur. At block 320, data is gathered which reflects the efficiency of the wireless channels and delays encountered in data transfer through each channel. At block 330, a determination is made as to whether the wireless channels or protocols are experiencing data backup. At block 340, if a data backup is occurring, priority is shifted to alleviate the backup. If no backup is detected, the disabled state for priority shifting is maintained.

Figure 4:
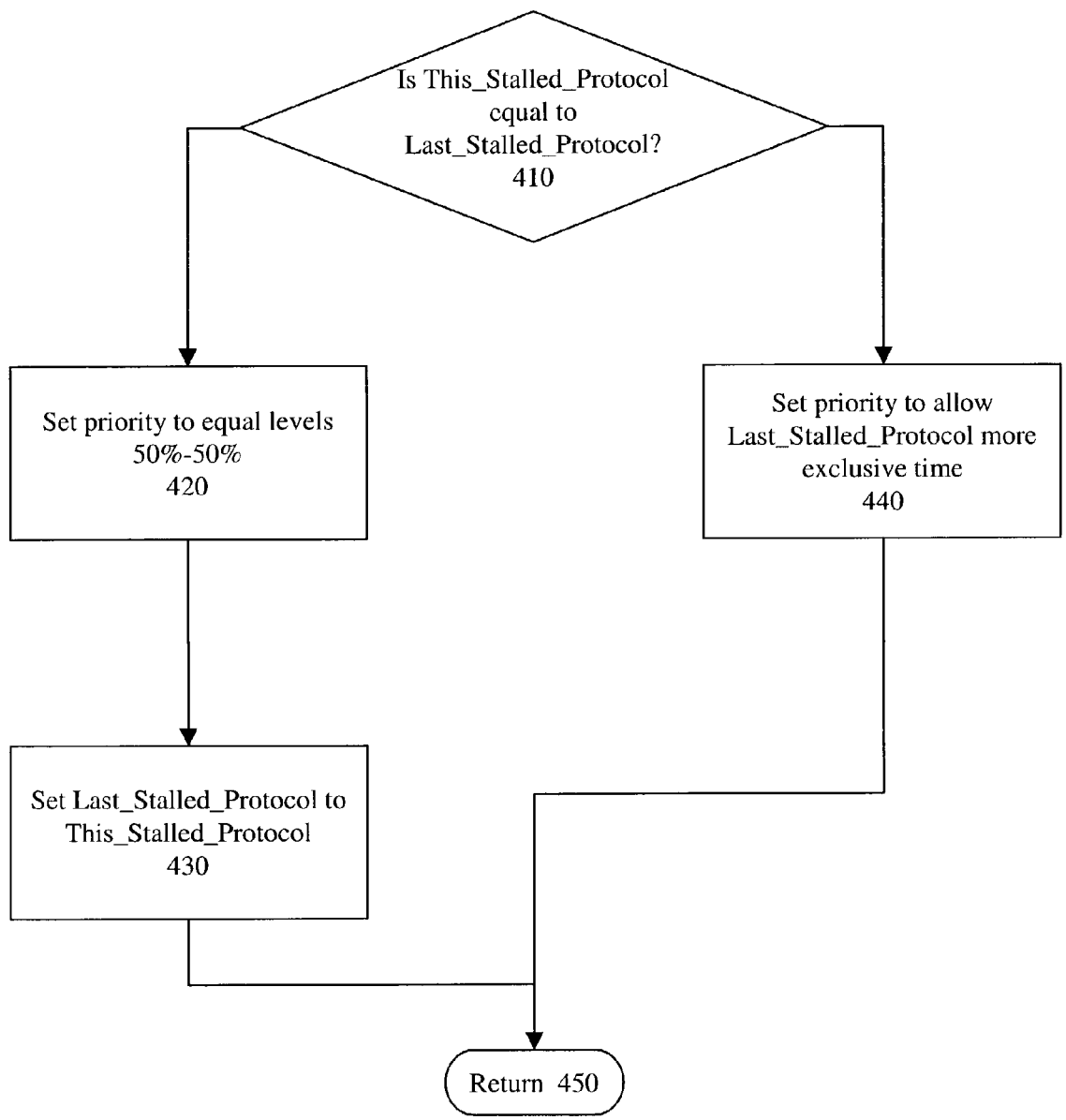
FIG. 4 illustrates yet another embodiment of a method.

FIG. 4 illustrates yet another embodiment of a method. This method relates more directly to shifting priorities. At block 410, a determination is made as to whether the currently stalled protocol (backed up channel) is the same channel that was previously delayed. If so, at block 440, priority is shifted further toward the stalled protocol. If not, at block 420, priority is set to equal levels between the two protocols. At block 430, the currently stalled protocol (or channel) is recorded for the next iteration of the method. At block 450, the method returns and allows processing to proceed.

Figure 5:
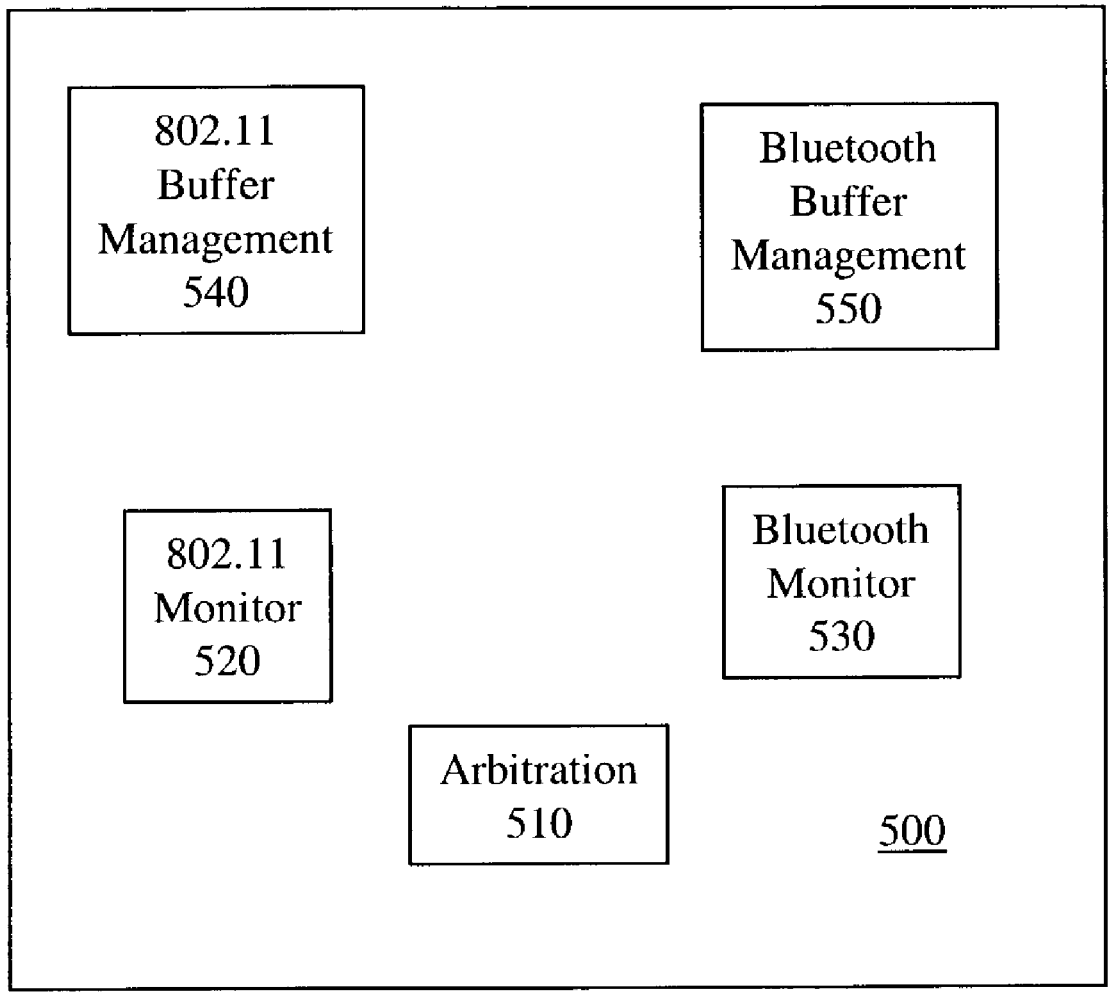
FIG. 5 illustrates an embodiment of a medium.

FIG. 5 illustrates an embodiment of a medium. Medium 500 includes arbitration block 510, 802.11 monitor block 520, Bluetooth monitor block 530, 802.11 buffer management block 540 and Bluetooth buffer management block 550. Each of the logic blocks may be implemented in a variety of ways, including as a block of instructions for execution by a processor. Arbitration block 510 may be expected to determine which of two channels gets priority and which gets stalled or gets a reduced duty cycle. 802.11 monitor block 520 may be expected to monitor 802.11 throughput and alert block 510 to backup conditions. Bluetooth monitor block 530 may similarly be expected to monitor Bluetooth throughput and alert block 510 to Bluetooth backup condtions. 802.11 buffer management block 540 may be expected to generally manage a buffer of data for an 802.11 radio or driver, and to implement stalls or priority shifts by reducing or increasing data available to an 802.11 radio. Bluetooth buffer management block 550 may be expected to provide similar management functions for a Bluetooth buffer.

Figure 6:
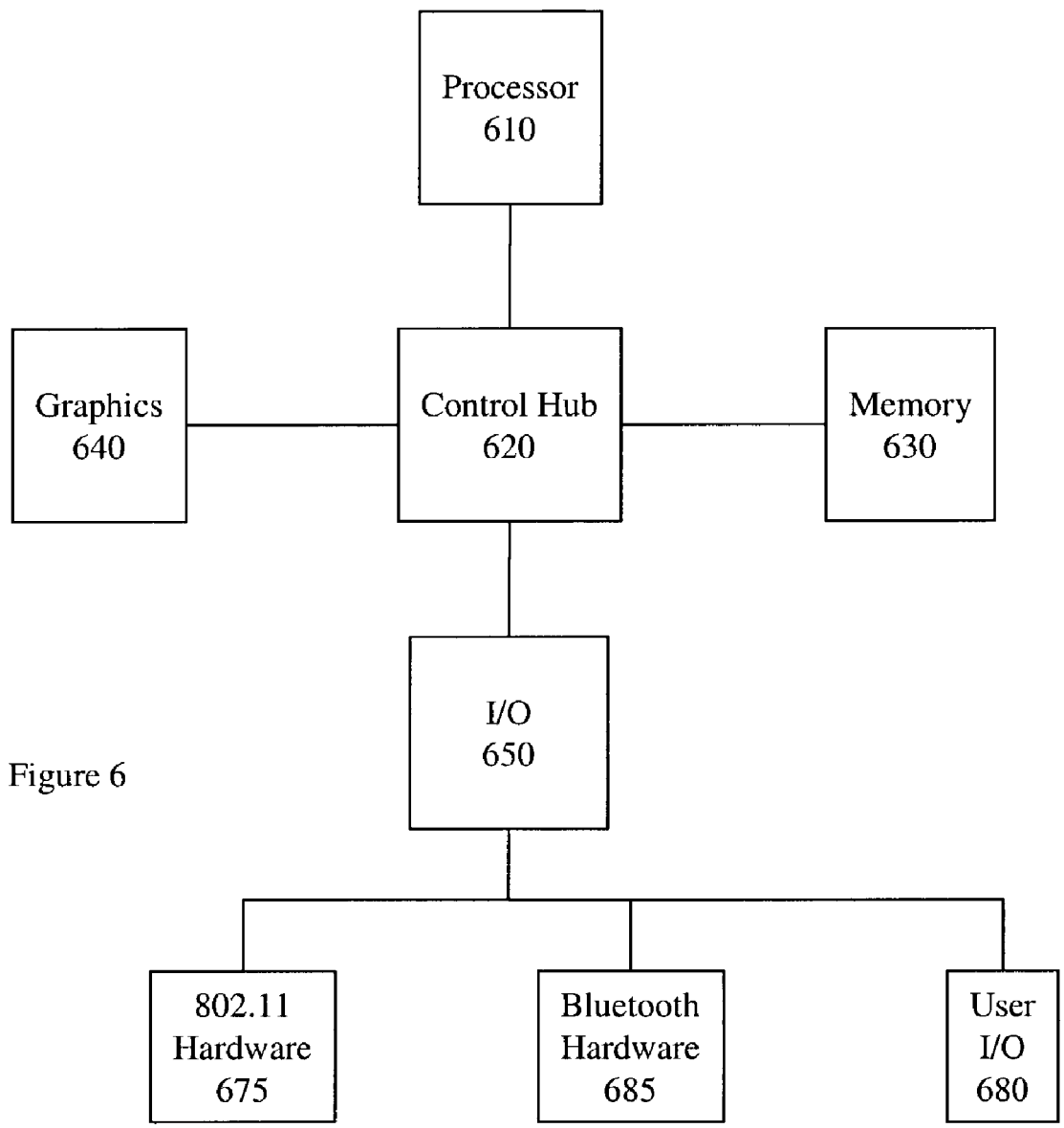
FIG. 6 illustrates an embodiment of a system.

FIG. 6 illustrates an embodiment of a system. Processor 610 is coupled to control hub 620. Control hub 620, in turn, is coupled to each of memory 630, graphics block 640 and I/O interface 650. In one embodiment, I/O interface 650 is coupled to a Bluetooth radio 685, which may include a radio-frequency transceiver and modem circuitry among other components. Similarly, I/O interface 650 is coupled to an 802.11 radio 675, which may include a radio-frequency transceiver and modem circuitry among other components. Moreover, I/O interface 650 is coupled to user I/O block 680, which may include a keyboard, mouse or similar pointing device, or other suitable user I/O devices.

The system including the processor 610, control hub 620 and I/O interface 650, in one embodiment, may be used to communicate with other devices using the Bluetooth protocol or the 802.11. The methods and apparatuses described previously may be incorporated into the system to achieve communication between these devices and to enhance throughput in backup situations.

Figure 7:
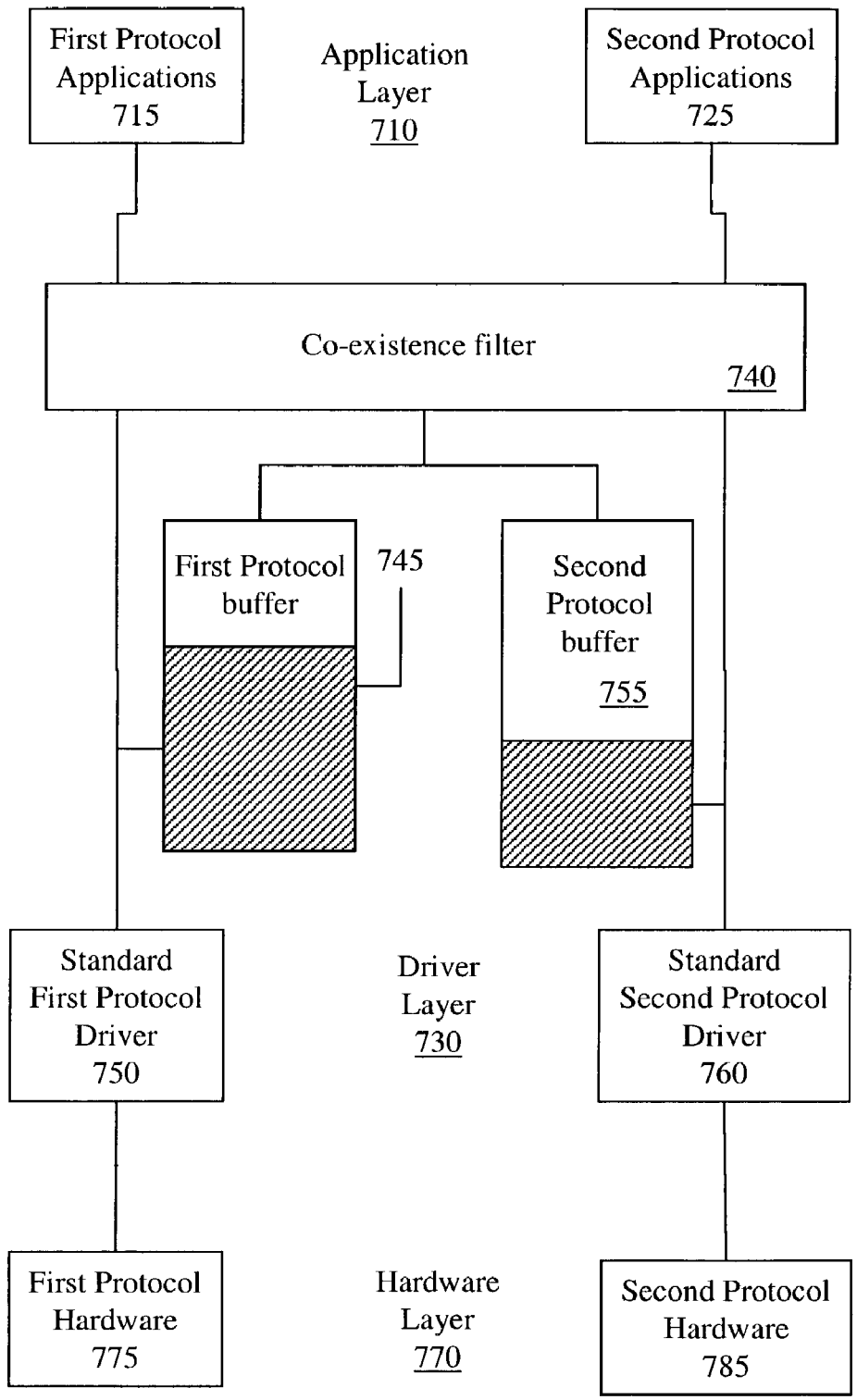
FIG. 7 illustrates an alternate embodiment of an apparatus.

FIG. 7 illustrates an alternate embodiment of an apparatus. The apparatus illustrated includes three layers of a computer or similar system, machine or device. The three layers are application layer 710, driver layer 730 and hardware layer 770. As will be appreciated, other layers may be incorporated within the spirit and scope of the present invention.

In application layer 710, first protocol applications 115 use the first communications protocol and hardware to communicate with devices, and second protocol applications 125 use the second protocol and hardware to communicate with devices. Moreover, some applications may use both the first and second protocols and hardware.

Driver layer 730 includes co-existence filter 740, buffer 745, buffer 755, driver 750 and driver 760. Co-existence filter 740 receives and transmits data to applications 715 and applications 725, and thereby has the ability to monitor throughput and efficiency in the first protocol and second protocol data paths. Co-existence filter 740 provides second protocol data to second protocol buffer 755 and first protocol data to first protocol buffer 745. Moreover, co-existence filter 740 controls both buffer 745 and buffer 755, allowing for regulation of data input and output from both buffers.

Driver 750 is the first protocol driver provided in the computer or system, and may be provided as part of an operating system, in conjunction with first protocol hardware (such as hardware 775) or from a different source. However, driver 750 need not be written to function specifically with co-existence filter 740, as driver 750 interfaces with buffer 745, just as it would were co-existence filter 740 not present. Driver 750 interfaces with buffer 745 to send data received by the hardware and to receive data for transmit. Similarly, driver 760 is the second protocol driver in the computer or system, with a source similar to one of the sources available for the first protocol driver 750. Driver 760 also interfaces with second protocol buffer 755, to receive data for transmit and to send data received by the hardware.

Hardware layer 770 includes first protocol hardware 775 and second protocol hardware 785 (and may contain other hardware as will be appreciated by one skilled in the art). First protocol hardware 775 is a component or device suitable for transmitting and receiving data according to the first protocol through an appropriate communications medium. Similarly, second protocol hardware 785 is a device or component suitable for receiving and transmitting data according to the second protocol through an appropriate communications medium.

Note that both of these components or devices may be expected to generally operate at a similar frequency or to otherwise interfere in one embodiment, thus allowing for potential interference either due to transmitting from one component to the other or due to noise in the system produced by one component and sensed by the other component. Note that in one embodiment, first protocol hardware 775 and second protocol hardware 785 use the same hardware to send two theoretically non-interfering signals outside a system. As will be appreciated, theoretically non-interfering signals may interfere in practice.

Figure 8:
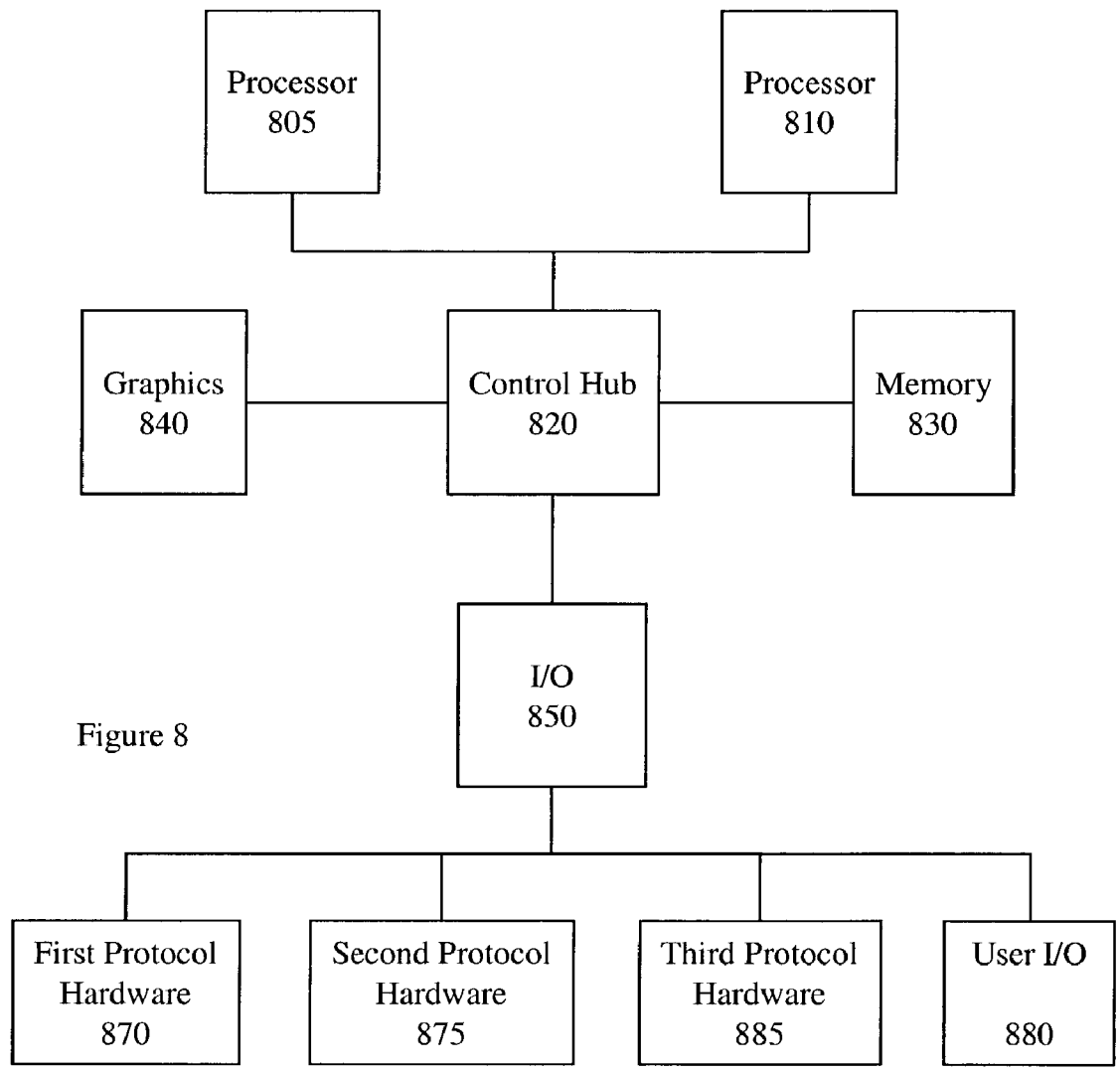
FIG. 8 illustrates an alternate embodiment of a system.

FIG. 8 illustrates an alternate embodiment of a system. Processor 805 and processor 810 are coupled to control hub 820. Control hub 820, is coupled to memory 830, graphics block 840 and I/O interface 850. In one embodiment, I/O interface 850 is coupled to a first protocol hardware component 870, which may include circuitry suitable for communicating using the first protocol, among other components. Similarly, I/O interface 850 is coupled to a second protocol hardware component 875, which may include circuitry suitable for communicating using the second protocol, among other components. Additionally, I/O interface 850 is coupled to a third protocol hardware component 885, which may include circuitry suitable for communicating using the third protocol, among other components. Moreover, I/O interface 850 is coupled to user I/O block 880, which may include a keyboard, mouse or similar pointing device, or other suitable user I/O devices.

The system including the processor 810, control hub 820 and I/O interface 850, in one embodiment, may be used to communicate with other devices using the first protocol, the second protocol, or the third protocol. The methods and apparatuses described previously may be incorporated into the system to achieve communication between these devices and to enhance throughput in backup situations. Should co-existence between the three protocols result in throughput problems, shifting priority to the most impacted protocol in a manner similar to that illustrated previously with respect to two protocols may be used to relieve these problems.

As will be appreciated, various different protocols may interfere in one way or another, and the methods and apparatuses described may be adapted for use with other protocols without undue experimentation. Furthermore, as will be appreciated, in a situation wherein three or more wireless channels potentially interfere, favoring the most backed-up channel may be implemented by adapting the present methods and apparatuses without undue experimentation.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices.

The present invention can be implemented by an apparatus for performing the operations herein. This apparatus may be specially constructed for the required purposes or it may comprise a machine such as a general purpose computer selectively activated or reconfigured by a computer program stored in the computer. Such a computer program may be stored in a machine readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIGS. 4, 5 or 7 (for example) may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard-wired circuitry by programming a general-purpose processor or by any combination of hardware and software. One of skill in the art will immediately appreciate that the invention can be practiced with computer system configurations. Configurations other than those described including hand held devices, multi-processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will be apparent from the description.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc. . . . ) as taken in action or causing a result. Such expressions are merely a shorthand way of saying that execution of the software by a computer causes the processor of the computer to perform an action or produce a result.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1 may be integrated into components, or may be subdivided into components. Similarly, the blocks of FIG. 4 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method comprising:

detecting a backup in transmission of data through a first wireless channel;

shifting priority between use of a first protocol radio and a second protocol radio from transmission of data through a second wireless channel of the second protocol radio to transmission of data through the first wireless channel of the first protocol radio, wherein the first wireless channel is a first protocol channel and the second wireless channel is a second protocol channel, and wherein the shifting priority comprises modifying a duty cycle having a first portion corresponding to a first amount of time devoted to transmission of data through the first protocol channel and a second portion corresponding to a second amount of time devoted to transmission of data through the second protocol channel;

determining if the backup decreases; and shifting priority back from transmission of data through the first wireless channel to transmission of data through the second wireless channel.

2. The method of claim 1 further comprising:

further shifting priority from transmission of data through the second wireless channel to transmission of data through the first wireless channel.

3. The method of claim 1 wherein:

the first wireless channel is a bluetooth channel and the second wireless channel is an 802.11 channel.

4. The method of claim 1 wherein:

the first wireless channel is an 802.11 channel and the second wireless channel is a bluetooth channel.

5. The method of claim 1 wherein the first amount of time is less than the second amount of time.

6. The method of claim 5 further comprising:

further shifting priority from transmission of data through the second wireless channel to transmission of data through the first wireless channel;

and wherein the first wireless channel is one of either an 802.11 channel and a bluetooth channel and the second wireless channel is an other of either an 802.11 channel and a bluetooth channel.

7. The method of claim 1 wherein:

shifting priority is accomplished by stalling the second wireless channel for a predetermined amount of time.

8. The method of claim 7 further comprising:

further shifting priority from transmission of data through the second wireless channel to transmission of data through the first wireless channel;

and wherein the first wireless channel is one of either an 802.11 channel and a bluetooth channel and the second wireless channel is an other of either an 802.11 channel and a bluetooth channel.

9. The method of claim 1 further comprising:

monitoring activity on the first wireless channel and on the second wireless channel.

10. A machine-readable medium embodying instructions, the instructions, when executed by a processor, causing the processor to perform a method, the method comprising:

detecting a backup in transmission of data through a first wireless channel;

shifting priority between use of a first protocol radio and a second protocol radio from transmission of data through a second wireless channel of the second protocol radio to transmission of data through the first wireless channel of the first protocol radio, wherein the first wireless channel is a first protocol channel and the second wireless channel is a second protocol channel, and wherein the shifting priority comprises modifying a duty cycle having a first portion corresponding to a first amount of time devoted to transmission of data through the first protocol channel and a second portion corresponding to a second amount of time devoted to transmission of data through the second protocol channel;

determining if the backup decreases; and shifting priority back from transmission of data through the first wireless channel to transmission of data through the second wireless channel.

11. The machine-readable medium of claim 10, wherein first amount of time is less than the second amount of time.

12. The machine-readable medium of claim 11 further embodying instructions, the instructions, when executed by a processor, causing the processor to perform a method wherein:

further shifting priority from transmission of data through the second wireless channel to transmission of data through the first wireless channel;

and wherein the first wireless channel is one of either an 802.11 channel and a bluetooth channel and the second wireless channel is an other of either an 802.11 channel and a bluetooth channel.

13. The machine-readable medium of claim 10 further embodying instructions, the instructions, when executed by a processor, causing the processor to perform a method further comprising:

shifting priority is accomplished by stalling the second wireless channel for a predetermined amount of time.

14. The machine-readable medium of claim 12 further embodying instructions, the instructions, when executed by a processor, causing the processor to perform a method further comprising:

further shifting priority from transmission of data through the second wireless channel to transmission of data through the first wireless channel;

and wherein the first wireless channel is one of either an 802.11 channel and a bluetooth channel and the second wireless channel is an other of either an 802.11 channel and a bluetooth channel.

15. The machine-readable medium of claim 10 further embodying instructions, the instructions, when executed by a processor, causing the processor to perform a method wherein:

the first wireless channel is an 802.11 channel and the second wireless channel is a bluetooth channel.

16. The machine-readable medium of claim 10 further embodying instructions, the instructions, when executed by a processor, causing the processor to perform a method wherein:

the first wireless channel is a bluetooth channel and the second wireless channel is an 802.11 channel.

17. An apparatus comprising:

means for detecting a backup in transmission of data through a first wireless channel;

means for shifting priority between use of a first protocol radio and a second protocol radio from transmission of data through a second wireless channel of the second protocol radio to transmission of data through the first wireless channel of the first protocol radio, wherein the first wireless channel is a first protocol channel and the second wireless channel is a second protocol channel, and wherein the means for shifting priority comprises means for modifying a duty cycle having a first portion corresponding to a first amount of time devoted to transmission of data through the first protocol channel and a second portion corresponding to a second amount of time devoted to transmission of data through the second protocol channel;

and means for determining if the backup decreases.

18. The apparatus of claim 17, wherein:

the means for shifting priority further for shifting priority back from transmission of data through the first wireless channel to transmission of data through the second wireless channel.

19. The apparatus of claim 18 further comprising:

means for monitoring activity on the first wireless channel and activity on the second wireless channel.

20. The apparatus of claim 19 wherein:
the first wireless channel is one of either an 802.11 channel or a bluetooth channel and the second wireless channel is an other of either an 802.11 channel or a bluetooth channel.

21. A system comprising:
a processor;
a control hub coupled to the processor;
a memory coupled to the control hub;
an I/O hub coupled to the control hub;
a first wireless interface coupled to the I/O hub;
a second wireless interface coupled to the I/O hub;
and wherein the processor to:
detect a backup in transmission of data through a first wireless channel;
shift priority between use of a first protocol radio and a second protocol radio from transmission of data through a second wireless channel of the second protocol radio to transmission of data through the first wireless channel of the first protocol radio, wherein the first wireless channel is a first protocol channel and the second wireless channel is a second protocol channel, and wherein the processor is operable to modify a duty cycle having a first portion corresponding to a first amount of time devoted to transmission of data through the first protocol channel and a second portion corresponding to a second amount of time devoted to transmission of data through the second protocol channel;
determine if the backup decreases; and
shift priority back from transmission of data through the first wireless channel to transmission of data through the second wireless channel.

22. The system of claim 21 wherein:
the first wireless channel is one of either an 802.11 channel or a bluetooth channel and the second wireless channel is an other of either an 802.11 channel or a bluetooth channel;
the first wireless channel associated with the first wireless interface and the second wireless channel associated with the second wireless interface.

23. The system of claim 22 wherein the processor further to:
monitor activity on the first wireless channel and on the second wireless channel.

24. The system of claim 23 wherein the processor further to:
further shift priority from transmission of data through the second wireless channel to transmission of data through the first wireless channel.

25. The system of claim 24 wherein:
the processor to stall the second wireless channel for a predetermined amount of time in order to shift priority.

26. The system of claim 25 further comprising:
a first wireless channel buffer associated with the first wireless interface;
a second wireless channel buffer associated with the second wireless interface;
and wherein:
the processor to stall the second wireless channel by halting flow of data from the second wireless channel buffer to the second wireless interface.

27. The system of claim 24, wherein channel, the second portion corresponding to activity on the second wireless channel the first amount of time is less than the second amount of time.

28. An apparatus, comprising:
a first logic block to detect a backup in transmission of data through a first wireless channel;
a second logic block to shift priority between use of a first protocol radio and a second protocol radio from transmission of data through a second wireless channel of the second protocol radio to transmission of data through the first wireless channel of the first protocol radio, wherein the first wireless channel is a first protocol channel and the second wireless channel is a second protocol channel, and wherein the second logic block comprises a third logic block to modify a duty cycle having a first portion corresponding to a first amount of time devoted to transmission of data through the first protocol channel and a second portion corresponding to a second amount of time devoted to transmission of data through the second protocol channel; and
a fourth logic block to determine if the backup decreases.

29. The apparatus of claim 28 further comprising:
a first wireless data buffer associated with the first wireless channel, the first wireless data buffer to supply data to an 802.11 driver; and
a second wireless data buffer associated with the second wireless channel, the second wireless data buffer to supply data to a bluetooth driver.

30. The apparatus of claim 28 further comprising:
a first wireless data buffer associated with the first wireless channel, the first wireless data buffer to supply data to a bluetooth driver; and
a second wireless data buffer associated with the second wireless channel, the second wireless data buffer to supply data to an 802.11 driver.

* * * * *

UNITED STATES PATENT AND TRADEMARK OFFICE
CERTIFICATE OF CORRECTION

PATENT NO. : 7,228,103 B2  Page 1 of 1
APPLICATION NO. : 10/194378
DATED : June 5, 2007
INVENTOR(S) : Mangold It is certified that error appears in the above-identified patent and that said Letters Patent is hereby corrected as shown below:

In column 10, at line 18, delete "12" and insert --13--.

Signed and Sealed this

Twenty-ninth Day of January, 2008

JON W. DUDAS
*Director of the United States Patent and Trademark Office*